(12) United States Patent
Shin et al.

(10) Patent No.: US 8,832,174 B2
(45) Date of Patent: Sep. 9, 2014

(54) SYSTEM AND METHOD FOR DYNAMIC TASK MIGRATION ON MULTIPROCESSOR SYSTEM

(75) Inventors: Young Sam Shin, Hwaseong-si (KR); Shi Hwa Lee, Seoul (KR); Seung Won Lee, Hwaseong-si (KR); Jeong Joon Yoo, Yongin-si (KR); Min Young Son, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 142 days.

(21) Appl. No.: 12/923,757

(22) Filed: Oct. 6, 2010

(65) Prior Publication Data

US 2011/0173622 A1 Jul. 14, 2011

(30) Foreign Application Priority Data

Jan. 8, 2010 (KR) .................. 10-2010-0001692

(51) Int. Cl.
 *G06F 15/16* (2006.01)
 *G06F 9/48* (2006.01)
(52) U.S. Cl.
 CPC ................... *G06F 9/4856* (2013.01)
 USPC ....................................... 709/201

(58) Field of Classification Search
 None
 See application file for complete search history.

(56) References Cited

U.S. PATENT DOCUMENTS

| 5,655,132 A | 8/1997 | Watson | |
| 2005/0251667 A1 | 11/2005 | Iwamoto | |
| 2006/0190942 A1* | 8/2006 | Inoue et al. | 718/100 |
| 2008/0114854 A1* | 5/2008 | Wong et al. | 709/214 |
| 2009/0165014 A1* | 6/2009 | Park | 718/105 |
| 2010/0076933 A1* | 3/2010 | Hamilton et al. | 707/640 |

FOREIGN PATENT DOCUMENTS

| KR | 10-2006-0132852 | 12/2006 |
| KR | 10-2009-0005921 | 1/2009 |
| KR | 10-2009-0066765 | 6/2009 |
| KR | 10-2009-0080753 | 7/2009 |

* cited by examiner

*Primary Examiner* — Jude Jean Gilles
*Assistant Examiner* — Suraj Joshi
(74) *Attorney, Agent, or Firm* — Staas & Halsey LLP

(57) ABSTRACT

A multiprocessor system and a migration method of the multiprocessor system are provided. The multiprocessor system may process dynamic data and static data of a task to be operated in another memory or another processor without converting pointers, in a distributed memory environment and in a multiprocessor environment having a local memory, so that dynamic task migration may be realized.

17 Claims, 10 Drawing Sheets

SYSTEM AND METHOD FOR DYNAMIC TASK MIGRATION ON MULTIPROCESSOR SYSTEM

CROSS-REFERENCE TO RELATED APPLICATIONS

This application claims the benefit of Korean Patent Application No. 10-2010-0001692, filed on Jan. 8, 2010, in the Korean Intellectual Property Office, the disclosure of which is incorporated herein by reference.

BACKGROUND

1. Field

One or more embodiments of the following description relate to a multiprocessor system and a migration method of the multiprocessor system that may process dynamic data and static data of a task to be performed in another memory or another processor without converting pointers, in a distributed memory environment and in a multiprocessor environment having a local memory.

2. Description of the Related Art

As applications such as multimedia being processed in real-time increase, demand for improvement of system performance for computing devices is increasing. Moreover, it becomes difficult to efficiently and rapidly process an application using only a single processor. Due to such a challenge, multiprocessor computing technologies have emerged along with development of semiconductor integration technologies. Multiprocessors provide many advantages in energy efficiency and performance improvement, compared with single processors.

To obtain more suitable performance in a multiprocessor computing environment, tasks may be executed sequentially or in parallel, depending on the task.

An information device using a multiprocessor may include, for example, a personal portable terminal, a server, a mobile phone, a mobile computer, a Set-Top Box (STB), or a digital video device. The information device may be a main part of a future embedded system. Additionally, the information device needs to have a function of enabling various applications to be executed in a single device in response to user requests.

Various types of multiprocessor systems are being proposed to improve performance of an embedded system. A multiprocessor system has a hierarchy memory structure, which includes a private memory to execute tasks and a shared memory to enable different processors to share data.

The hierarchy memory structure may cause a difference in response characteristics between memories due to discontinuousness and location of memories. Such problems are to be solved to support task migration between processors.

Furthermore, a processor used in the embedded system is generally not able to use a Memory Management Unit (MMU) to provide a virtual memory environment due to limitations in a core size and power consumption.

Therefore, there is a demand for a method and system to change a location where static data and dynamic data of a task are to be executed in a multi-core system where an MMU is not included, rather than pointers being converted.

SUMMARY

The foregoing and/or other aspects are achieved by providing a multiprocessor system, including a migration determining unit to determine a migration type of a task in response to a migration request for the task having at least one state, and a migration processing unit to process the task to be exported from a source node and to process the task to be imported into a destination node, depending on the determined migration type.

The foregoing and/or other aspects are achieved by providing a migration method in a multiprocessor system, the method including receiving a migration request for a task having at least one state, determining a migration type of the task in response to the received migration request, and processing a migration of the task depending on the determined migration type.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
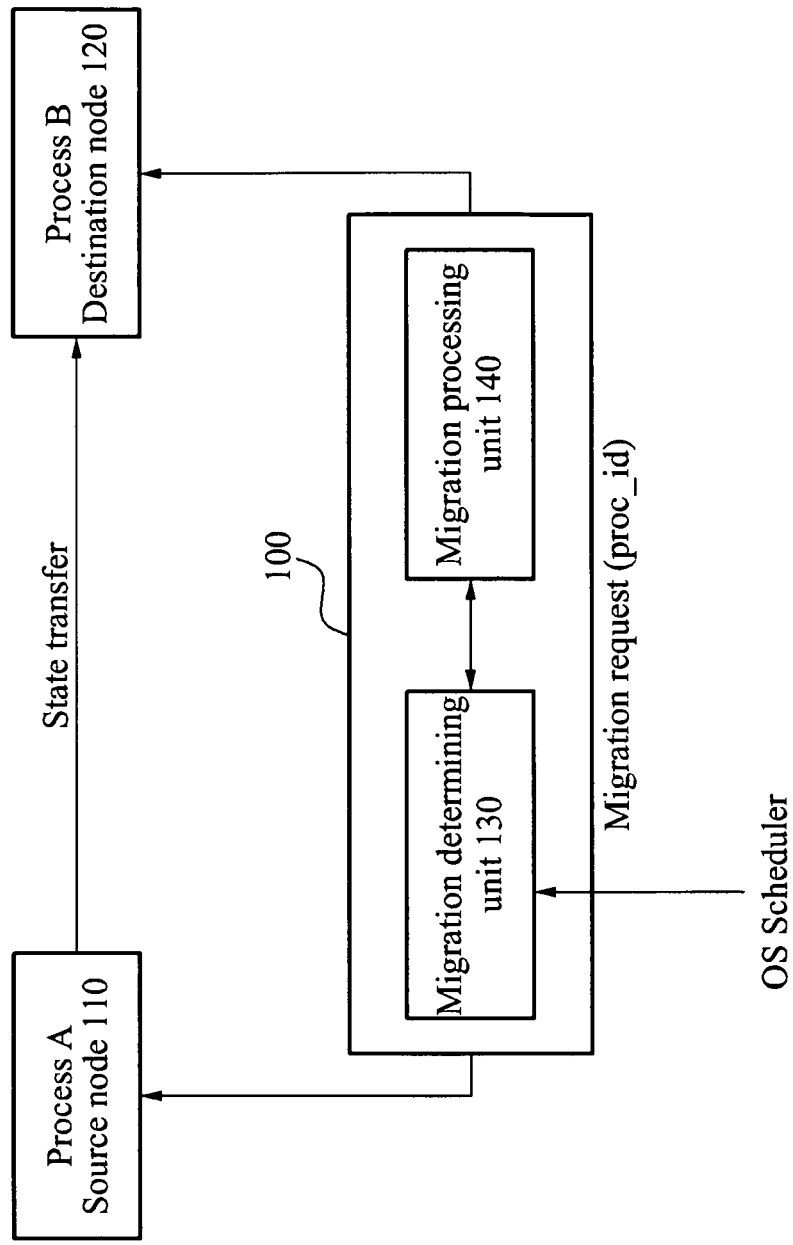
FIG. 1 illustrates a block diagram of a multiprocessor system according to embodiments.

Reference will now be made in detail to embodiments, examples of which are illustrated in the accompanying drawings, wherein like reference numerals refer to the like elements throughout. Embodiments are described below to explain the present disclosure by referring to the figures.

A "task" used herein may include at least one thread, starting from a concept of a process, and a process migration may signify migrating a process between two nodes, namely, a source node and a destination node during execution.

FIG. 1 illustrates a multiprocessor system 100 according to embodiments.

The multiprocessor system 100 of FIG. 1 may include a migration determining unit 130 and a migration processing unit 140.

Specifically, to perform process migration, the multiprocessor system 100 may control a task to migrate from a source node 110 to a destination node 120.

The migration determining unit 130 may determine a migration type of a task in response to a migration request for the task, based on a current state of system resources used by the task and a migration request frequency. Here, the task may have at least one state.

The migration processing unit 140 may process the task to be exported from the source node 110, and may process the task to be imported into the destination node 120, depending on the determined migration type.

The multiprocessor system 100 may process various types of migrations.

For example, the migration processing unit 140 may control the at least one state being exported from the source node 110 to be imported into the destination node 120, depending on the determined migration type. Here, the destination node may be located in a kernel level. Additionally, resources used to process the task in the source node 110 may also be used in the destination node 120.

The migration processing unit 140 may control the task to be exited and exported from the source node 110, and may control the task to be created and imported into the destination node 120, depending on the determined migration type.

The migration processing unit 140 may create the task using a checkpoint at which the task is exited.

The migration processing unit 140 may control the task in the source node 110 to be converted from an active state to an inactive state and exported, and may control the task in the destination node to be converted from the inactive state to the active state and imported, depending on the determined migration type.

The migration processing unit 140 may check a checkpoint at which the task is switched to the inactive state, and may control the task to be imported.

According to embodiments, it is possible to dynamically reconstruct an optimal system in a multiprocessor environment with a non-uniform memory architecture, and to reallocate data of a task based on a Base Register (BR) where dynamic data and static data of the task may be transferred even when a Memory Management Unit (MMU) is not used.

Additionally, to reconstruct a system with a minimum cost, task migration and task exchange may be performed between processors with a non-uniform memory architecture, and thus it is possible to realize dynamic task migration in a multiprocessor computing environment. Furthermore, only basic essential functions for migrating tasks may be used to monitor the system, to search for an optimal reconstruction combination, and to appropriately handle errors.

Figure 2:
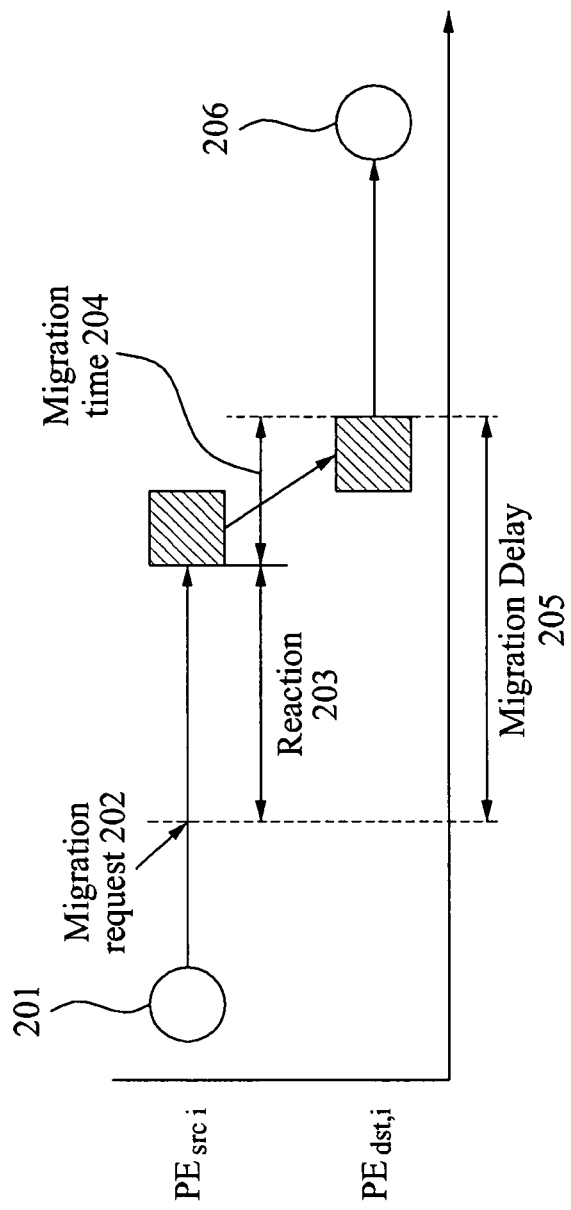
FIG. 2 illustrates a diagram of task migration between processors in a multiprocessor system according to embodiments.

FIG. 2 illustrates an example of task migration between processors in a multiprocessor system according to embodiments.

Referring to FIG. 2, a task 201 in a source node may start to migrate at a point in time of a migration request 202. After a period of time corresponding to a migration delay 205 elapses, the task 201 in a source node may be migrated to become a task 206 in a destination node.

The migration delay 205 may be interpreted as a time obtained by adding a reaction time 203 and a migration time 204.

The migration request may include a request for migration of a predetermined process at an application or Operating System (OS) level, after a setting of a negotiation on a migration of a process associated with a change in loads of a predetermined system, for example, in the case of a dynamic load imbalance or a new setting caused by a change in application requirements.

When a migration of a predetermined process is requested, the migration processing unit 140 may determine a migration type applicable to the predetermined process.

For example, when a migration type is set in advance during generation of a process, the migration processing unit 140 may perform task migration depending on the set migration type.

Alternatively, when there is no migration type set in advance and when migration is requested, the migration processing unit 140 may determine a migration type, based on a current state of resources used by the process and a migration request frequency.

For example, the migration processing unit 140 may categorize the migration request frequency into three levels: "high", "medium", and "low". When the migration request frequency is determined to be "high," the migration processing unit 140 may apply a replication migration method. When the migration request frequency is determined to be "medium," the migration processing unit 140 may apply a recreation migration method. When the migration request frequency is determined to be "low," the migration processing unit 140 may apply a transparent migration method.

Alternatively, when there is no data regarding the migration request frequency, the migration processing unit 140 may categorize a current memory usage status, such as a system memory allocation and an I/O occupancy, into three levels, namely "high", "medium", and "low", based on the current state of resources used by the process. The migration processing unit 140 may appropriately apply one of the replication migration type, the recreation migration type, and the transparent migration type.

In response to the migration request 202 at the point in time, the reaction time 203 may be interpreted as extraction of processes. In other words, the multiprocessor system may store a state, such as a kernel context associated with memory contents, a processor state (register contents), communication state (e.g., open files and message channels).

During the migration time 204, the task may be transmitted and imported so that a process may be executed using a new resource. Specifically, when states of all used processes in the source node are transferred to the destination node, the states may be reflected on a process of the destination node.

An interface may be provided to export a state of a process from the source node and to import the state into an instance of the destination node, so that the process migration may be performed.

Figure 3:
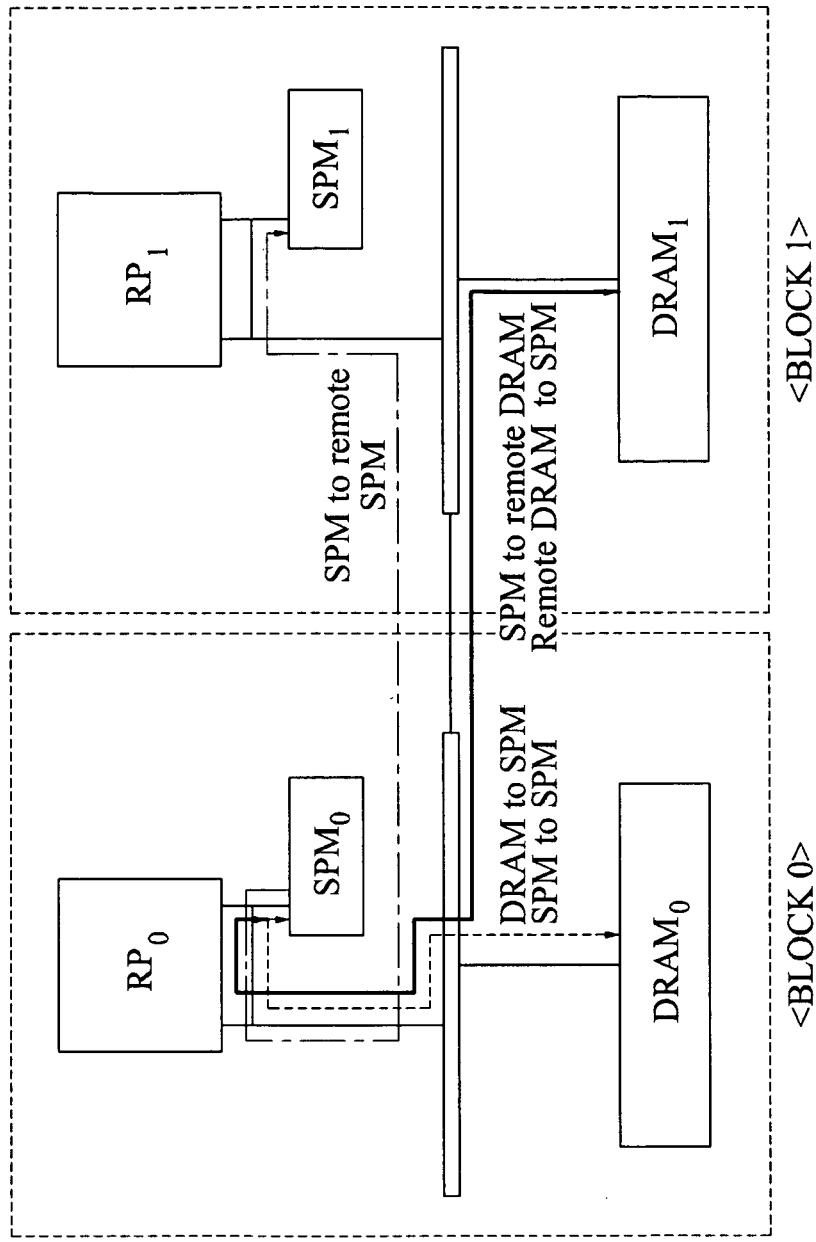
FIG. 3 illustrates a diagram of an architecture of a multiple Reconfigurable Processor (RP) system applicable to a multiprocessor system according to embodiments.

FIG. 3 illustrates an architecture of a multiple Reconfigurable Processor (RP) system applicable to a multiprocessor system according to embodiments.

The multiple RP system shown in FIG. 3 is merely an example of a multiprocessor system to which embodiments are applicable, and there is no limitation to a scope of the embodiments. Accordingly, a design of the multiple RP system may be variously modified.

Studies on process migration are closely related to a hardware target architecture. For example, in a symmetric multiprocessing (SMP) architecture, processes may be scheduled by a conventional scheduling method, and there is no further study issue about the process migration. However, in a system with non-uniform memory access characteristics, for example, in a Non-Uniform Memory Access (NUMA) system, the process migration is being actively studied. In the NUMA system, each processor may take a different amount of time to access different memories depending on a type or a physical location of the different memories.

A Massively Parallel Processing (MPP) architecture is being studied with regard to a process migration method. In the MPP architecture, a great number of processors may be connected by a Network-on-Chip (NoC), and most of processes may be executed in a private memory.

Additionally, the MPP architecture may be highly likely to cause a failed node among the great number of processors, and thus, stability may be reliably ensured through the process migration. The embodiments may provide an efficient process migration method in a multiple RP environment with non-uniform memory access characteristics.

The multiple RP system of FIG. 3 includes two RPs, such as $RP_0$ and $RP_1$.

Each of the two RPs may have a local Scratch Pad Memory (SPM, $SPM_0$ and $SPM_1$, for example), and may share data using a shared Dynamic Random Access Memory (DRAM, such as $DRAM_0$ and $DRAM_1$). The DRAM may have its own locality depending on a hardware configuration.

The two RPs may have different access times, and may access all types of memories. Additionally, the two RPs may include local caches for instructions. Based on the structural characteristics of the RPs, an efficient process migration algorithm may be proposed.

Memories of the RPs shown in FIG. 3 may have the NUMA architecture.

The multiple RP system may include an SPM that does not have data caches and is to be managed by software, unlike other cores used in the SMP architecture. Additionally, data for a Coarse Grain Array (CGA) mode may be contained in the SPM, and hardware configuration information of a CGA may be contained in a CGA configuration memory, so that a desired performance may be maintained. Unlike task migration in a general SMP hardware architecture, a task migration may be performed in the RP system by transferring information used to manage the task, as well as, SPM data and CGA configuration data of the task, and by changing connection information between peripheral hardware devices. In particular, migrating of the SPM and the CGA configuration memory is important in operations for the task migration.

Figure 4:
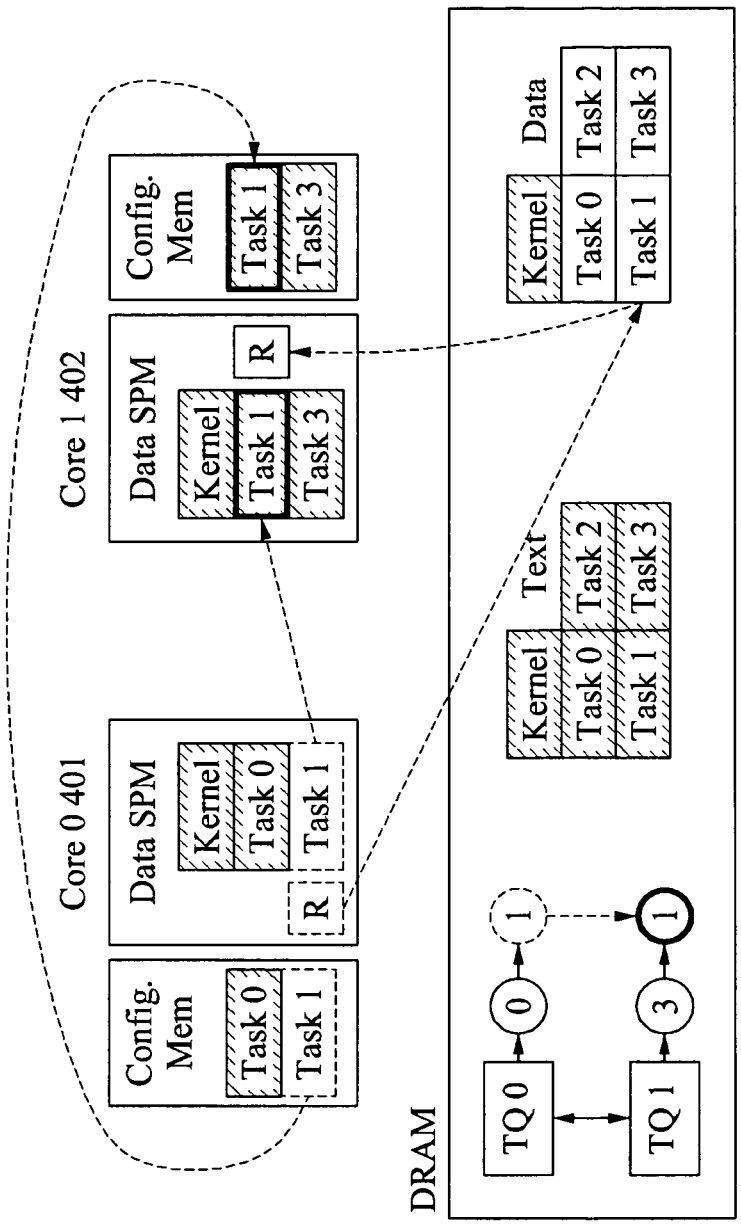
FIG. 4 illustrates a diagram of task migration on a multiple RP system in a multiprocessor system according to embodiments.

FIG. 4 illustrates an example of task migration in a multiple RP system in a multiprocessor system according to the embodiments.

The task migration in the multiprocessor system according to the embodiments is shown in FIG. 4. An address is to be reinterpreted to use a dynamic memory and a static memory in a processor, as well as in a task in an RP architecture where no MMU is used. In other words, there is a demand to reinterpret a point of data, namely a parameter indicating a memory address, or a destination node for an actual address.

In a conventional distribution environment, a virtual memory has been used to solve the above problems. However, currently, a virtual memory is not used in the multiple RP architecture, due to a decrease in memory access performance and an increase in costs for system configuration.

To perform migration of an SPM and a CGA configuration memory, the following functions are to be performed. For example, when a task is determined to migrate from "Core 0" 401 to "Core 1" 402, data of an SPM and a CGA configuration memory, which are located relatively close to "Core 0" 401, may be transferred to an SPM and a CGA configuration memory, which are located relatively close to "Core 1" 402. Here, the transferred data may be copied to another memory that is physically placed in a different location from the SPM and CGA configuration memory. In this example, an application may access to data at the same address even when the data is physically placed in different locations. To support copying of the data and to transfer a data portion of a task between the RPs, the embodiments may describe a method of converting an address based on a BR (base register). The method may be used to manage task execution resources based on segments, and may employ an offset-based address generation method using a BR.

Figure 5:
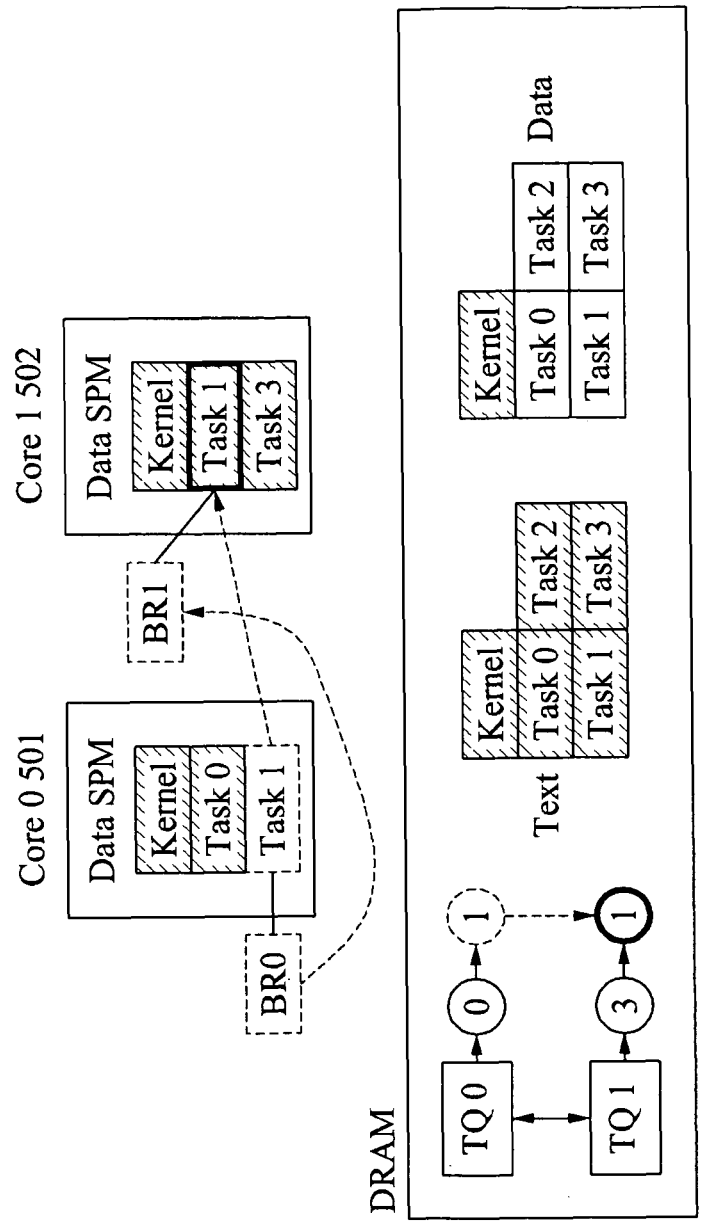
FIG. 5 illustrates a diagram of task migration based on a Base Register (BR) in a multiprocessor system according to embodiments.

FIG. 5 illustrates an example of task migration based on a BR in a multiprocessor system according to embodiments.

An address generation method for an SPM to be relocated may be addressed by adding a BR to an offset, namely a relative data location. A task may include its BR in a context and change the BR during context switching, to generate an address in its segment, so that the task may be executed.

In FIG. 5, an actual effective address for task 1 may be generated by Equation 1.

Effective Address=Base Register(Task 1)+Offset(data relative address) [Equation 1]

Data of all tasks may be written in an addressable area based on a bit size of an offset after "0", and a value based on a location on an actually executed process may be set in the BR, so that an effective address may be generated.

Figure 6:
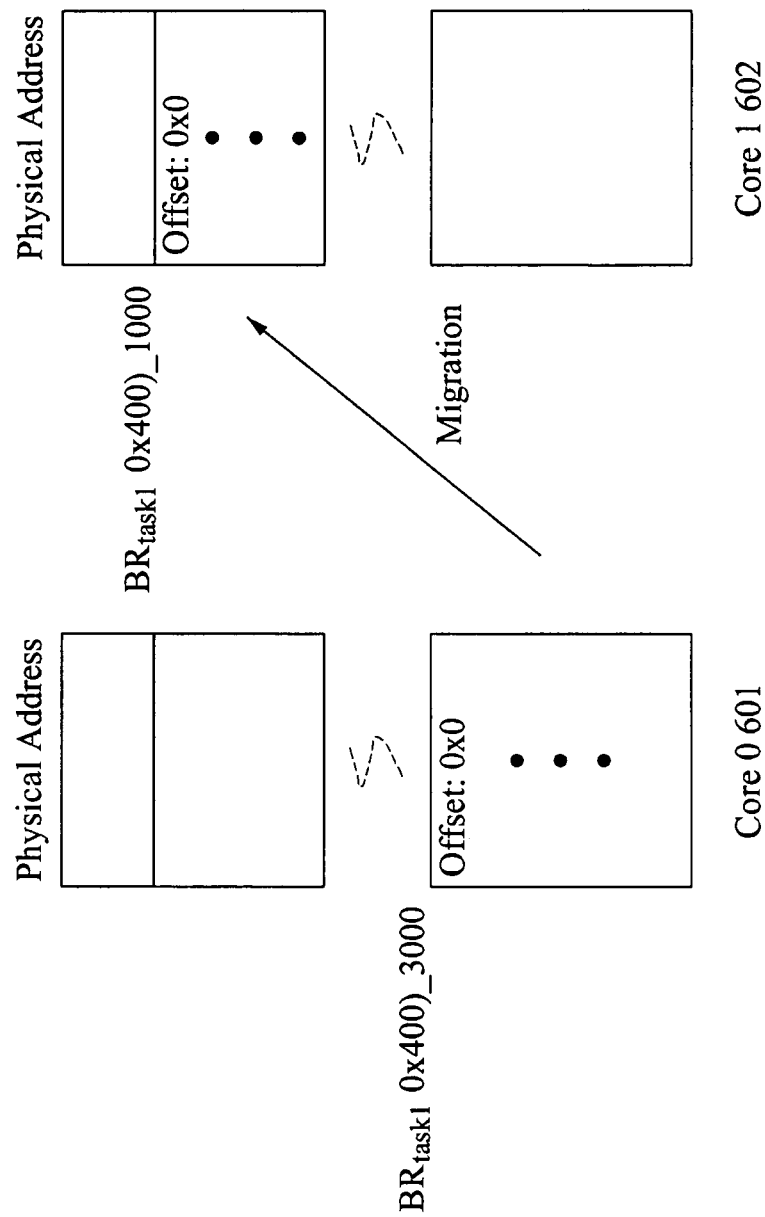
FIG. 6 illustrates a diagram of a method of relocating data of a task based on a BR in a multiprocessor system according to embodiments.

FIG. 6 illustrates an example of a method of relocating data of a task based on a BR in a multiprocessor system according to embodiments.

In FIG. 6, "task 1" executed in "Core 0" 601 may migrate to "Core 1" 602.

Data of an actual task may exist in an offset area of the task. The BR may be reset to an area mapped after migration of an actual processor according to a change in the BR, and an effective address may be generated.

The above method may enable a task to physically migrate without using an MMU, and may also enable data to be relocated without a decrease in performance.

To implement an efficient task migration method in an RP architecture configured as shown in FIG. 3, there is a demand to develop an algorithm based on locality of a task. The locality of the task may be determined based on factors to be described below. In the task migration, the locality may be represented as affinity.

First, the locality of the task may be based on a difference in memory access time depending on a hierarchical memory structure and a memory type. For example, a Reconfigurable Processor (RP) may include a local SPM, namely a Static Random Access Memory (SRAM), to rapidly access to data, and may store a great amount of data using a DRAM.

Additionally, in a prototype of a current multi-RP, a DRAM has different access times for each RP depending on a location, and thus, the access time may also be considered during the migration.

Furthermore, the locality of the task may be based on an I/O locality depending on spatial locations of peripheral devices, such as a hardware accelerator for multimedia data processing, or a Liquid Crystal Display (LCD) for a screen display.

Moreover, frequencies of using Inter-Process Communication (IPC) or shared data, and response characteristics may also be used to determine the locality of the task.

In the task migration, tasks that frequently communicate with each other may be defined as a single group, and groups may migrate.

Figure 7:
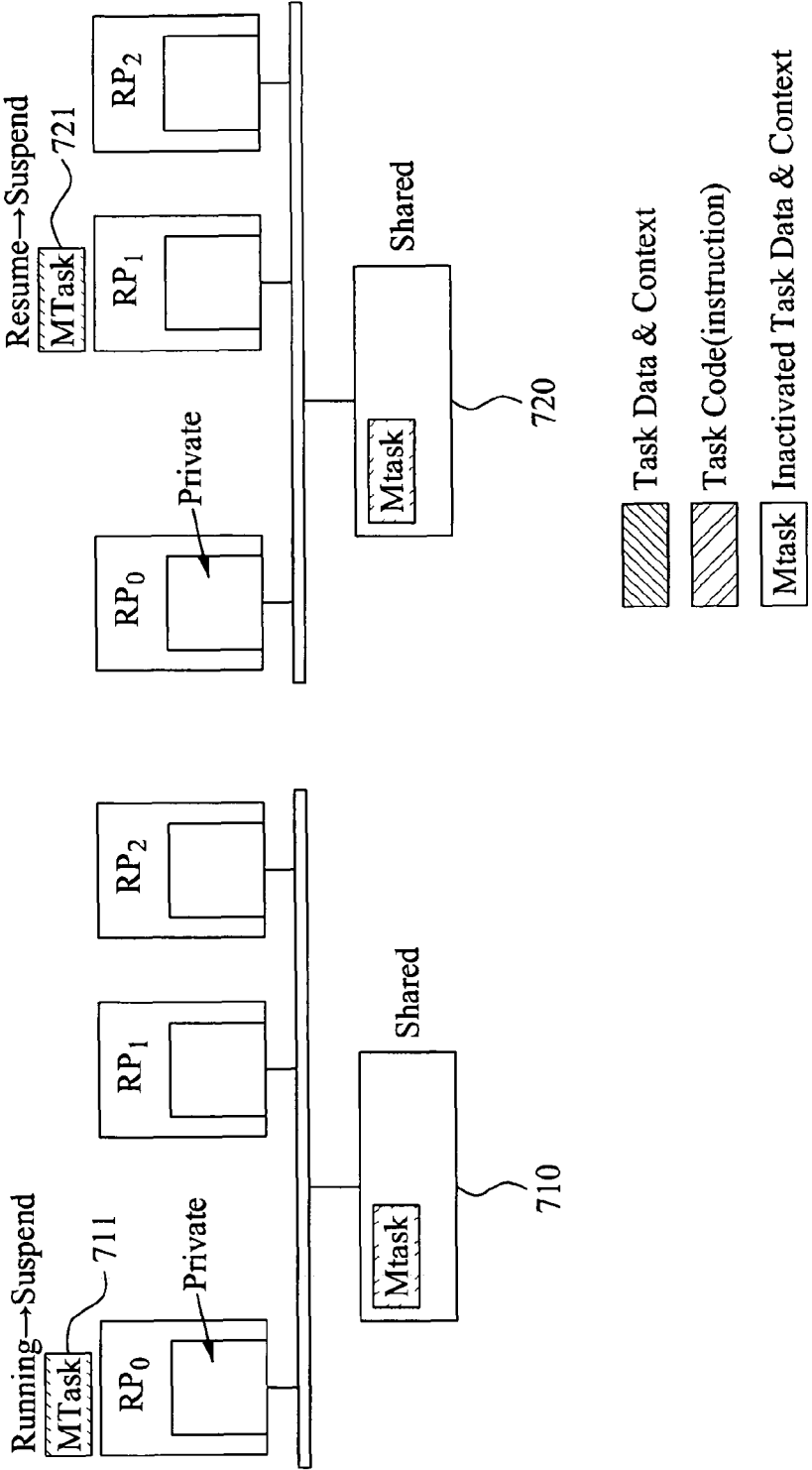
FIG. 7 illustrates a diagram of a transparent migration method in a multiprocessor system according to embodiments.
Figure 8:
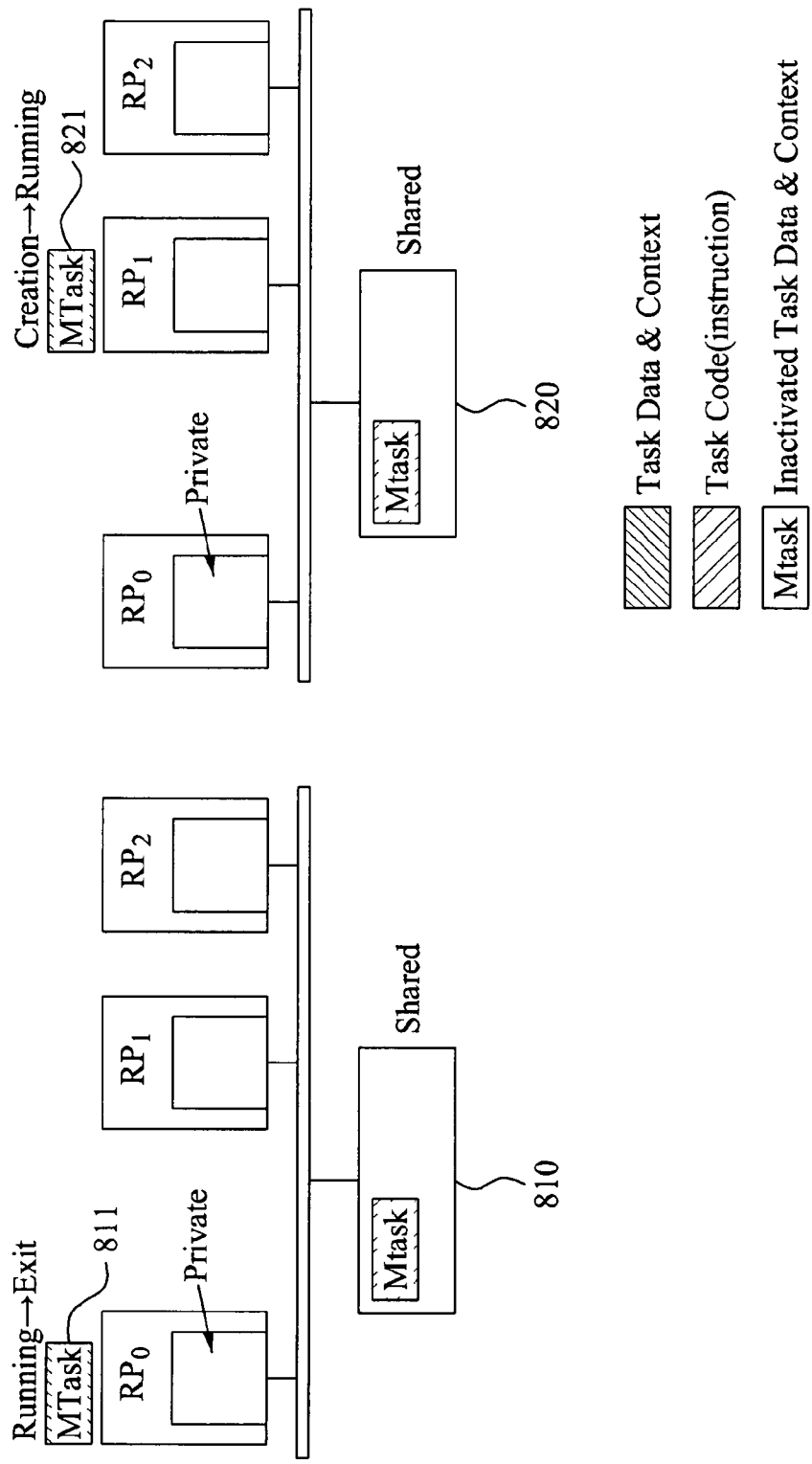
FIG. 8 illustrates a diagram of a recreation migration method in a multiprocessor system according to embodiments.
Figure 9:
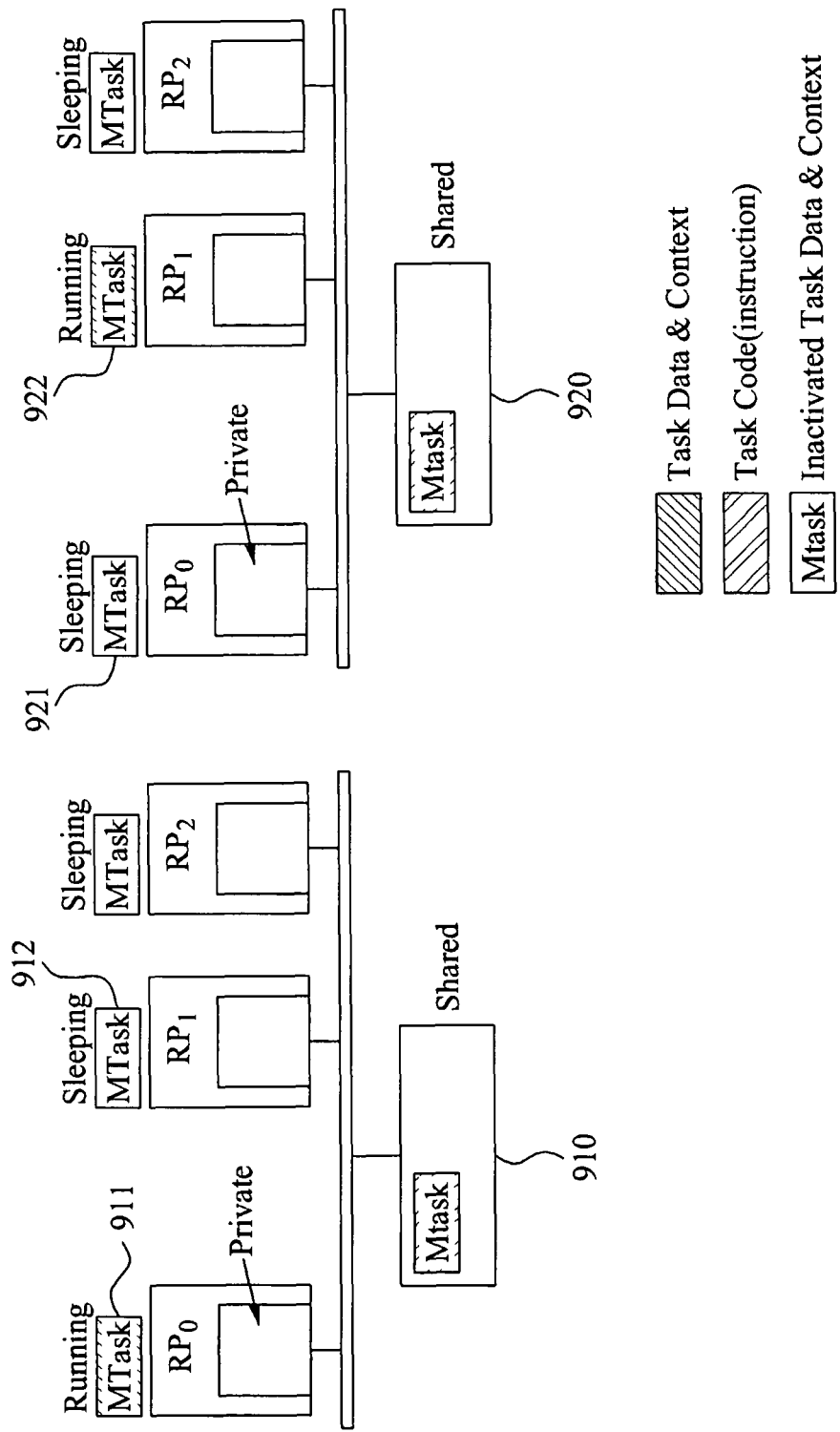
FIG. 9 illustrates a diagram of a replication migration method in a multiprocessor system according to embodiments.

To efficiently perform task migration in the embodiments, three types of task migration may be defined as shown in FIGS. 7 through 9. A task migration initiation method using a checkpoint may be applied to capture a migration state of the task.

The above factors used to determine the locality of the task may make it difficult to actually perform task migration and to use a migrated task. In addition, it is difficult for the task to actually migrate due to a real-time characteristic of an embedded system. Thus, structural characteristics of a target system and behavioral characteristics of an application to be executed may be closely analyzed, and a migration algorithm may be applied.

FIG. 7 illustrates an example of a transparent migration method in a multiprocessor system according to embodiments.

A transfer migration request may transfer a migration request for a Task Control Block (TCB) to a migration daemon of a destination node.

An architecture of a multiple RP may be based on only an instruction cache penalty with respect to a code of a task. In other words, the code of the task may be excluded from a migration state to be transferred.

An application used in an RP may include, for example, an audio, a video, three-dimensional (3D) graphics, and the like. Such a multimedia application may have relatively soft real-time characteristics. A frame or a bit rate of data to be processed under user requirements may be set in advance, and may be measured at very regular time intervals. A migration delay may be permitted at a level satisfying the above deadline requirements.

Additionally, a model for executing processes of an application may repeatedly process a provided frame. An application such as an audio may utilize points, such as a frame that is already processed and a frame to be processed, as checkpoints for migration, and thus, the migration method proposed in the embodiments may be applied to the application. Here, the frames may be independent to each other.

The migration method of FIG. 7 may be supported by a kernel level, and may enable all states of a task 711 that is currently running at a predetermined point in time to migrate from a source node 710 to a destination node 720 located in the kernel level.

A migrated task 721 that migrates to the destination node 720 may transparently use all resources that were already used. A migration initiation time may be in proportion to a size of states of a task for migration. The size of the states may be determined based on, for example, a kernel context, a memory, an IPC, and an open I/O.

FIG. 8 illustrates an example of a recreation migration method in a multiprocessor system according to embodiments.

In this example, a task 811 that is currently running in a source node 810 may be exited, and another task 821 may be created in a destination node 820. Accordingly, a minimum amount of task state information may be transferred using a checkpoint.

FIG. 9 illustrates an example of a replication migration method in a multiprocessor system according to embodiments.

Multiple nodes have tasks 921 and 922 that are respectively copied from tasks 911 and 912. Only the tasks 911 and 922 in a node where an application is actually executed may be in a running state, and the tasks 912 and 921 in the other node may be in a sleeping state. When a task migration is performed, the tasks 911 in a source node 910 may enter the sleeping state, and the task 922 in a destination node 920 may enter the running state.

A checkpoint may also be used, and a minimum amount of state information may be transferred, so that the task migration may be realized.

The three types of task migration as described above may be determined based on characteristics of a task during a system design. When a task for migration has a small number of states, the transparent migration method of FIG. 7 may be used to perform task migration. When there is a point where a state to be transferred from a predetermined state becomes minimum based on characteristics of an application, the recreation migration method of FIG. 8 or the replication migration method of FIG. 9 may be used to perform task migration. Additionally, when a memory has sufficient space, the replication migration method of FIG. 9 may be applied to reduce a time taken to recreate a task, so that the task may very quickly migrate.

Figure 10:
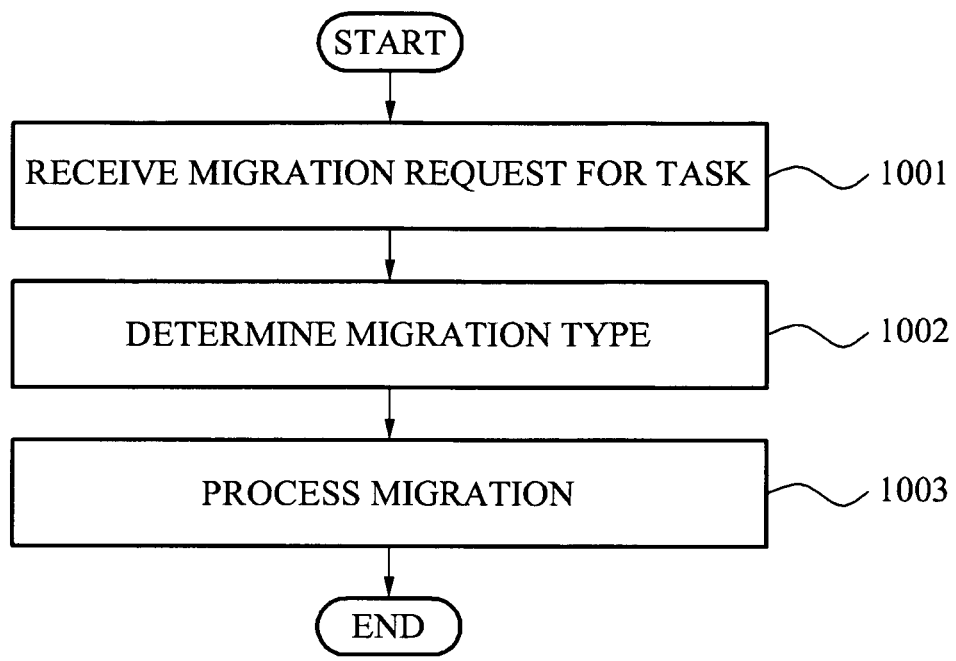
FIG. 10 illustrates a flowchart of a migration method in a multiprocessor system according to embodiments.

FIG. 10 illustrates a flowchart of a migration method in a multiprocessor system according to embodiments.

Referring to FIG. 10, in operation 1001, a migration request for a task having at least one state may be received. In operation 1002, a migration type of the task may be determined in response to the received migration request.

In operation 1003, a migration of the task may be processed depending on the determined migration type.

Specifically, to process the migration in operation 1003, the task may be processed to be exported from a source node, and may be processed imported into a destination node.

Additionally, the at least one state exported from the source node may be controlled to be imported into the destination node, depending on the determined migration type. Here; the destination node may be located in a kernel level.

Furthermore, the task may be controlled to be exited and exported from the source node, and may be controlled to be created and imported into the destination node, depending on the determined migration type.

Moreover, to process the migration in operation 1003, the task in the source node may be controlled to be converted from an active state to an inactive state and exported, and the task in the destination node may be controlled to be converted from the inactive state to the active state and imported, depending on the determined migration type.

Therefore, in the above-described migration method, the states of the task may be processed to be exported from the sources node in response to the migration request, so that the exported states may be executed in the destination mode.

Here, a dequeued TCB may be removed from a queue of the source node, and data for SMP and CGA may be controlled to be transferred to a shared memory.

The TCB may be interpreted as a data structure where task kernel information of a task for migration is stored.

The migration method according to the embodiments may use a checkpoint method to capture a point of the migration.

Additionally, the migration method according to the embodiments may include performing migration initiation to actually transfer the TCB and source node information.

The migration method according to the embodiments may include storing, in a shared memory, a TCB data structure which is used to copy the TCB and stored in an SPM.

In a dequeued IPC, a corresponding TCB may be dequeued from an IPC wait queue for each task.

In a transfer TCB, a memory may be allocated to store a TCB of a migrated task, and a TCB stored in a shared memory may be copied.

According to the embodiments, it is possible to dynamically reconstruct an optimal system in a multiprocessor environment with a non-uniform memory architecture.

Additionally, according to the embodiments, it is possible to reallocate data of a task based on a BR where dynamic data and static data of the task may be transferred even though not using an MMU.

Furthermore, according to the embodiments, to reconstruct a system with a minimum cost, task migration and task exchange may be performed between processors with a non-uniform memory architecture, and thus it is possible to realize dynamic task migration in a multiprocessor computing environment.

Moreover, according to the embodiments, only basic essential functions for migrating tasks may be used to monitor the system, to search for an optimal reconstruction combination, and to appropriately handle errors.

The migration method in the multiprocessor system according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A multiprocessor system, comprising:
   a migration determining unit to determine a migration type of a task in response to a migration request for the task, the task having at least one state; and
   a migration processing unit to process the task to be exported from a source node and to process the task to be imported into a destination node, depending on the determined migration type,
   wherein the migration type of the task includes a replication migration type, a recreation migration type, and a transparent migration type, and
   wherein the migration type of the task is determined based upon a migration request frequency and a current state of system resources used by the task,
   wherein the migration type is determined based upon the current state of system resources when there is no data regarding the migration request frequency.

2. The multiprocessor system of claim 1, wherein the migration processing unit controls the at least one state being exported from the source node to be imported into the destination node depending on the determined migration type, the destination node being located in a kernel level.

3. The multiprocessor system of claim 2, wherein resources used to process the task in the source node are used in the destination node.

4. The multiprocessor system of claim 1, wherein the migration processing unit controls the task to be exited and exported from the source node, and controls the task to be created and imported into the destination node, depending on the determined migration type.

5. The multiprocessor system of claim 4, wherein the migration processing unit creates the task using a checkpoint at which the task is exited.

6. The multiprocessor system of claim 1, wherein the migration processing unit controls the task in the source node to be converted from an active state to an inactive state and exported, and controls the task in the destination node to be converted from the inactive state to the active state and imported, depending on the determined migration type.

7. The multiprocessor system of claim 1, wherein the migration processing unit checks a checkpoint at which the task is converted to the inactive state, and controls the task to be imported.

8. The multiprocessor system of claim 1, wherein the migration type is determined based upon a current memory usage status.

9. The multiprocessor system of claim 1,
   wherein if the migration request frequency is determined to be high, the migration processing unit determines the migration type to be the replication migration type,
   wherein if the migration request frequency is determined to be medium, the migration processing unit determines the migration type to be the recreation migration type, and
   wherein if the migration request frequency is determined to be low, the migration processing unit determines the migration type to be the transparent migration type.

10. The multiprocessor system of claim 1,
    wherein if the task has a small number of states, the migration type is determined to be the transparent migration type, and
    wherein if a memory has sufficient space, the migration type is determined to be the replication migration type.

11. The multiprocessor system of claim 1, wherein the migration determining unit and the migration processing unit of the multiprocessor system uses a non-uniform memory architecture that migrates or reallocates the task based on a base register (BR) and does not include a memory management unit (MMU) and/or a virtual memory.

12. The multiprocessor system of claim 1,
    wherein the migration type of the replication migration type includes the migration processing unit to controlling the task in the source node to be converted from an active state to an inactive state and exported, and controls the task in the destination node to be converted from the inactive state to the active state and to be imported,
    wherein the migration type of the recreation migration type includes the migration processing unit controlling the task to be exited and exported from the source node, and controls the task to be created and imported into the destination node, and
    wherein the migration type of the transparent migration type includes the task migrating from the source node to the destination node, and after migrating to the destination mode, the task uses resources that were previous to the migration to the destination node.

13. A migration method in a multiprocessor system, the method comprising:
    receiving a migration request for a task, the task having at least one state;
    determining a migration type of the task in response to the received migration request; and processing a migration of the task depending on the determined migration type, wherein the migration type of the task includes a replication migration type, a recreation migration type, and a transparent migration type, and wherein the migration type is determined based upon the current state of system resources when there is not data regarding the migration request frequency.

14. The method of claim 13, wherein the processing of the migration comprises:
processing the task to be exported from a source node; and
processing the task to be imported into a destination node.

15. The method of claim 13, wherein the processing of the migration comprises controlling the at least one state exported from the source node to be imported into the destination node depending on the determined migration type, the destination node being located in a kernel level.

16. The method of claim 13, wherein the processing of the migration comprises controlling the task to be exited and exported from the source node and controlling the task to be created and imported into the destination node, depending on the determined migration type.

17. The method of claim 13, wherein the processing of the migration comprises controlling the task in the source node to be converted from an active state to an inactive state and exported, and controlling the task in the destination node to be converted from the inactive state to the active state and imported, depending on the determined migration type.

* * * * *

UNITED STATES PATENT AND TRADEMARK OFFICE
CERTIFICATE OF CORRECTION

PATENT NO. : 8,832,174 B2
APPLICATION NO. : 12/923757
DATED : September 9, 2014
INVENTOR(S) : Young Sam Shin et al.

Page 1 of 1

It is certified that error appears in the above-identified patent and that said Letters Patent is hereby corrected as shown below:

In the Claims

Column 11, Line 5, In Claim 13, delete "not" and insert -- no --, therefor.

Signed and Sealed this
Twenty-third Day of December, 2014

Michelle K. Lee
*Deputy Director of the United States Patent and Trademark Office*